(12) United States Patent
Bryant

(10) Patent No.: US 11,891,269 B2
(45) Date of Patent: Feb. 6, 2024

(54) COUNTERTOP BARRIER DEVICE

(71) Applicant: Polly Bryant, Houston, TX (US)

(72) Inventor: Polly Bryant, Houston, TX (US)

(*) Notice: Subject to any disclaimer, the term of this patent is extended or adjusted under 35 U.S.C. 154(b) by 297 days.

(21) Appl. No.: 17/464,111

(22) Filed: Sep. 1, 2021

(65) Prior Publication Data

US 2023/0069667 A1   Mar. 2, 2023

(51) Int. Cl.
  *B65H 75/44* (2006.01)
  *A47J 47/00* (2006.01)
  *A47K 1/06* (2006.01)

(52) U.S. Cl.
  CPC ............ *B65H 75/446* (2013.01); *A47J 47/00* (2013.01); *A47K 1/06* (2013.01); *B65H 75/4471* (2013.01)

(58) Field of Classification Search
  CPC .... B65H 75/446; B65H 75/4471; A47J 47/00; A47K 1/06; A47F 2010/065
  USPC ................................... 108/90, 60; 312/140.4
  See application file for complete search history.

(56) References Cited

U.S. PATENT DOCUMENTS

| | | | | |
|---|---|---|---|---|
| 2,876,471 A * | 3/1959 | Kraemer | ................ | A47K 17/00 15/4 |
| 4,351,073 A | 9/1982 | Elsas | | |
| 5,067,546 A * | 11/1991 | Jeuffray | ................ | B60J 1/2044 160/262 |
| 5,518,309 A * | 5/1996 | St-Pierre | ................ | D06F 39/12 297/182 |
| 6,062,147 A * | 5/2000 | Footitt | ................... | A47B 17/00 108/50.01 |
| 6,227,600 B1 | 5/2001 | Chen | | |
| 6,386,378 B1 * | 5/2002 | Scharing | ................. | D06F 39/12 108/90 |
| 7,114,543 B2 * | 10/2006 | Heitel | ................. | E04F 10/0685 160/22 |
| D625,673 S | 10/2010 | Rodriguez | | |
| 8,287,060 B1 * | 10/2012 | Golias, Jr. | ............ | A47B 47/025 312/351 |
| 8,485,112 B1 * | 7/2013 | Madden | .............. | F16B 12/2009 108/90 |
| 9,032,567 B1 | 5/2015 | Galgano | | |
| D762,078 S | 7/2016 | Freese | | |
| 9,565,940 B2 * | 2/2017 | Wilson | ..................... | E04F 19/02 |
| 9,629,450 B1 | 4/2017 | Howard | | |
| 9,708,064 B2 | 7/2017 | Vandewall | | |
| 10,827,859 B2 * | 11/2020 | Luker | ................. | A47G 11/007 |

(Continued)

FOREIGN PATENT DOCUMENTS

GB     244277     12/1925

*Primary Examiner* — Jose V Chen

(57) ABSTRACT

A countertop barrier device for provision of a sanitary barrier between an article and a countertop includes a tubular housing, which is selectively mountable to a surface proximate to a back edge of a countertop so that the tubular housing is removably mounted to the surface and substantially parallel to the back edge. A slot is positioned in the tubular housing and extends from proximate to opposed ends of the tubular housing. A mat is selectively extensible from and retractable into the tubular housing through the slot. A fastener is engaged to the mat proximate to a leading edge of the mat. The fastener engages the countertop proximate to a front edge of the countertop so that the mat covers a portion of the countertop. An article can be positioned on the mat without the article coming into contact with the countertop.

11 Claims, 6 Drawing Sheets

(56) References Cited

U.S. PATENT DOCUMENTS

| | | | |
|---|---|---|---|
| 11,255,040 B2* | 2/2022 | Underly | D06F 29/02 |
| 11,352,833 B2* | 6/2022 | O'Brien | D06F 39/12 |
| 2015/0211240 A1* | 7/2015 | Coca | A47B 95/002 |
| | | | 52/468 |
| 2016/0106210 A1* | 4/2016 | Kassanoff | A47B 21/00 |
| | | | 108/60 |
| 2016/0157619 A1* | 6/2016 | Demosthene | F16B 1/00 |
| | | | 297/228.13 |
| 2021/0079659 A1* | 3/2021 | Heimbuck | E04F 10/0696 |
| 2022/0090365 A1* | 3/2022 | Beckerle | A47K 1/06 |

* cited by examiner

COUNTERTOP BARRIER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to barrier devices and more particularly pertains to a new barrier device for provision of a sanitary barrier between an article and a countertop. The present invention discloses is a barrier device comprising a mat, which is selectively extendible from a tubular housing to cover a portion of a countertop, thereby providing a sanitary barrier between articles subsequently positioned upon the mat and the countertop.

(2) Description of Related Art Including Information Disclosed Under 37 CFR 1.97 and 1.98

The prior art relates to barrier devices, which may comprise roller screens for windows of vehicles and structures, covers, screens, and nets for sinks. What is lacking in the prior art is a barrier device utilizing a selectively extendible mat for covering a portion of a countertop, thereby providing a sanitary barrier between articles subsequently positioned upon the mat and the countertop.

BRIEF SUMMARY OF THE INVENTION

An embodiment of the disclosure meets the needs presented above by generally comprising a tubular housing, which is configured to be mountable to a surface proximate to a back edge of a countertop so that the tubular housing is removably mounted to the surface and substantially parallel to the back edge. A slot is positioned in the tubular housing and extends from proximate to opposed ends of the tubular housing. A mat is selectively extensible from and retractable into the tubular housing through the slot. A fastener is engaged to the mat proximate to a leading edge of the mat. The fastener is configured to engage the countertop proximate to a front edge of the countertop so that the mat covers a portion of the countertop. The mat is configured for positioning of an article such that the article does not contact the countertop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
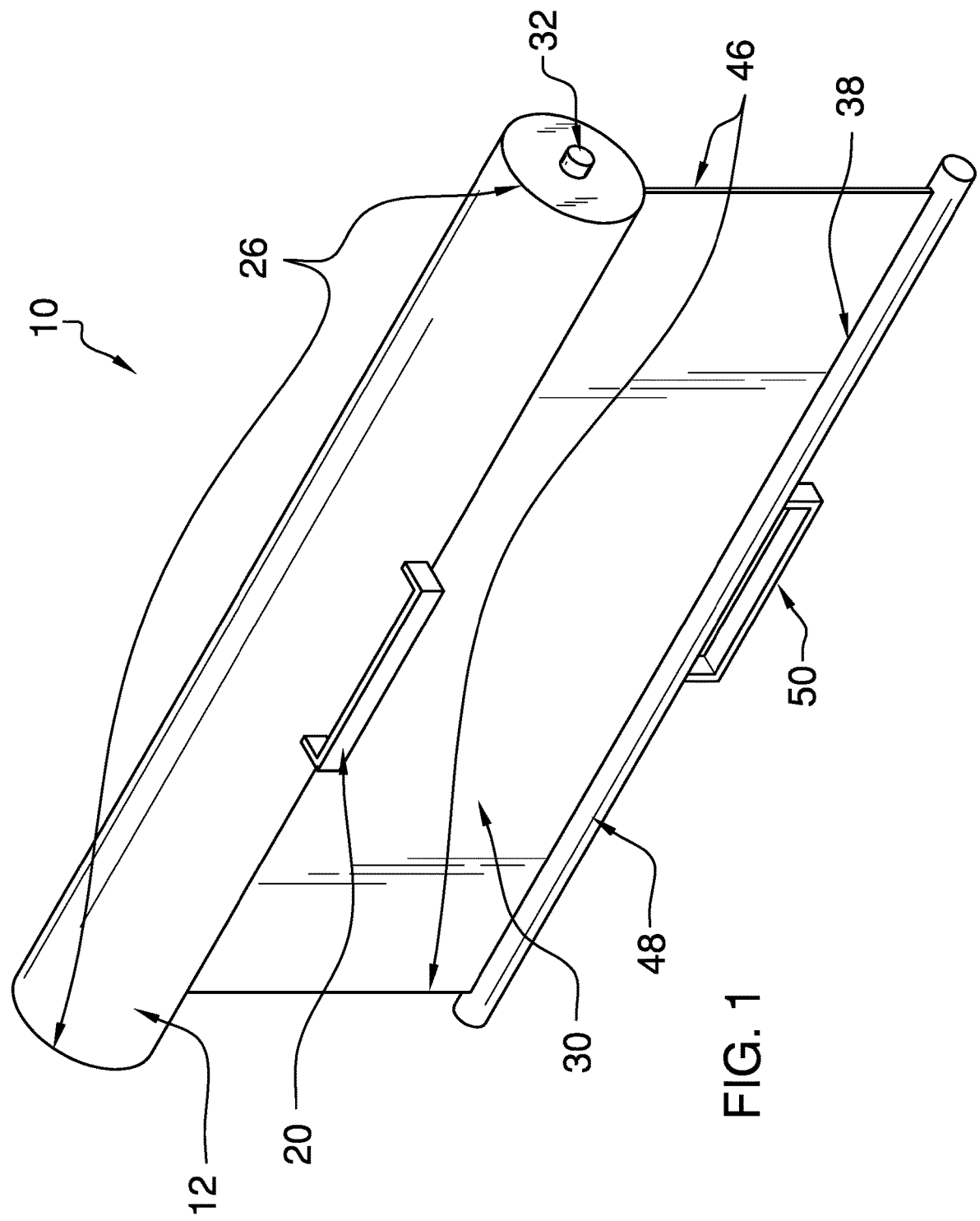
FIG. 1 is an isometric perspective view of a countertop barrier device according to an embodiment of the disclosure.
Figure 2:
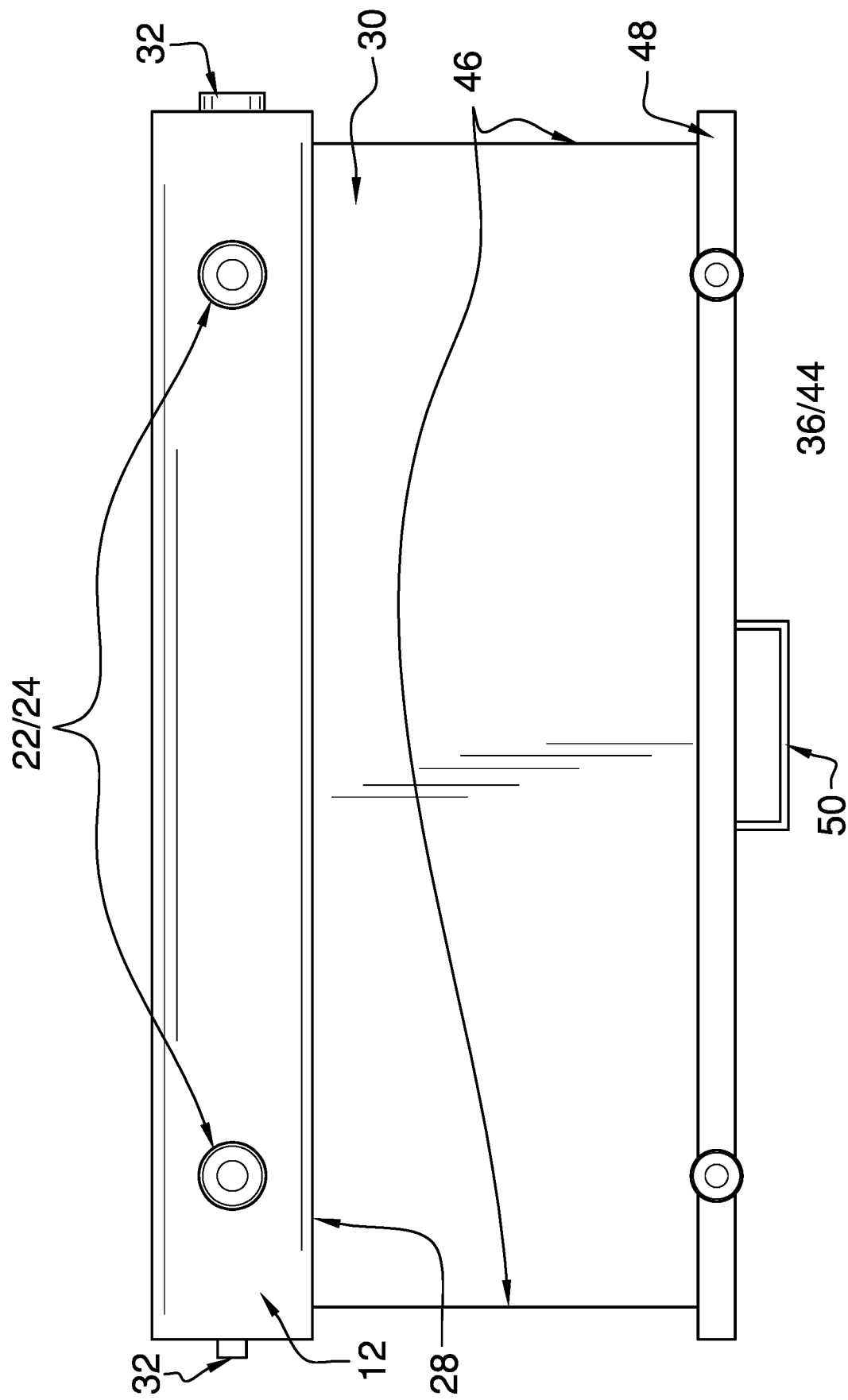
FIG. 2 is a bottom view of an embodiment of the disclosure.
Figure 3:
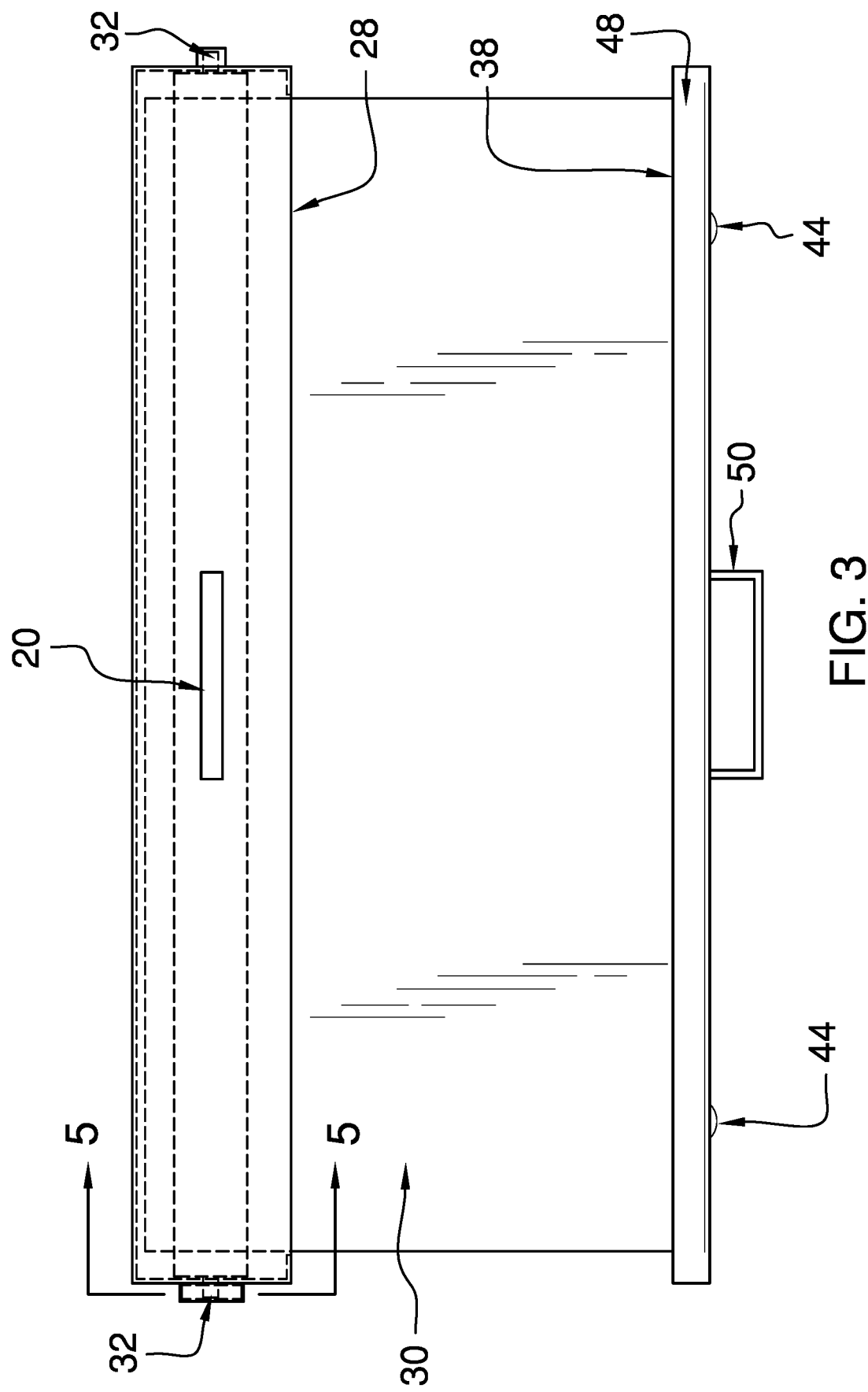
FIG. 3 is a top view of an embodiment of the disclosure.
Figure 4:
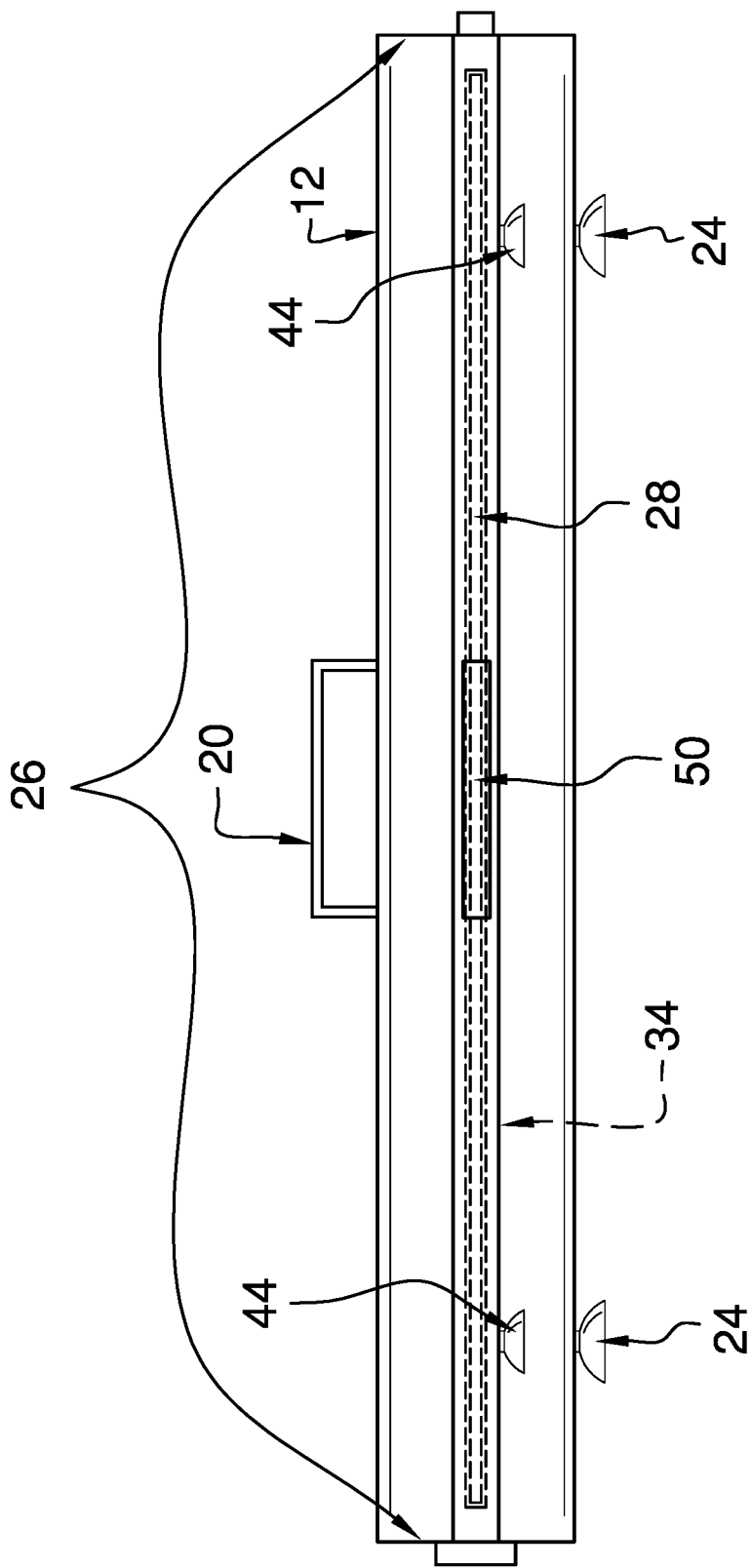
FIG. 4 is a front view of an embodiment of the disclosure.
Figure 5:
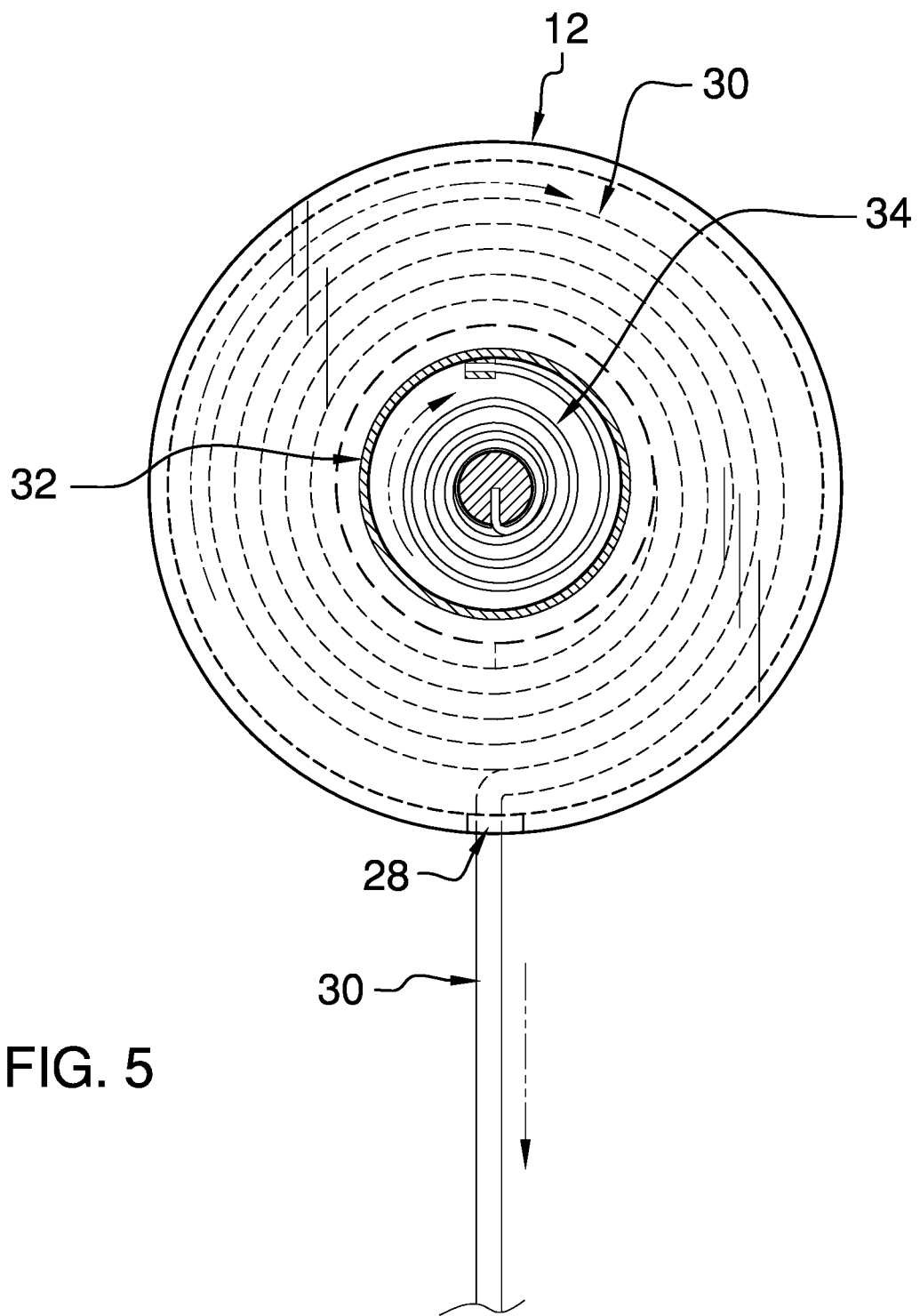
FIG. 5 is a cross-sectional view of an embodiment of the disclosure.
Figure 6:
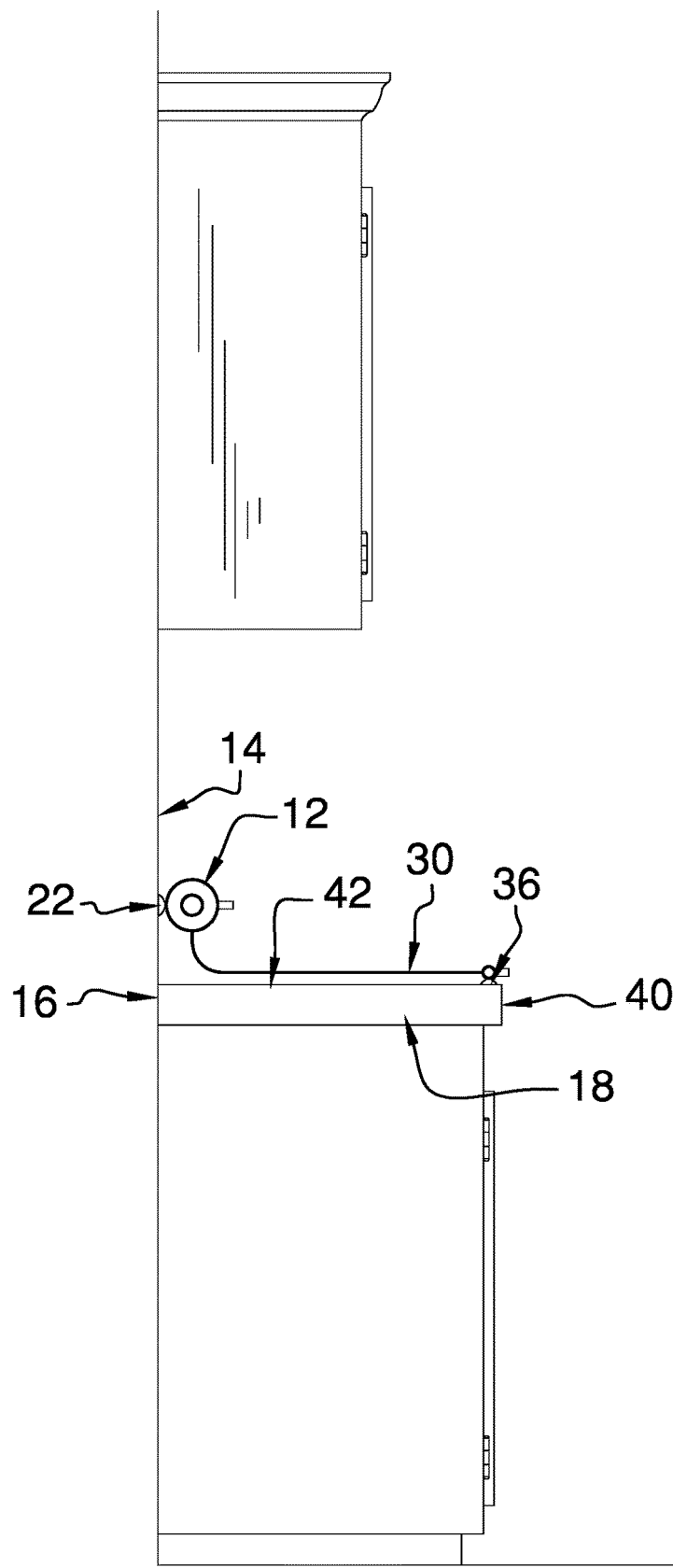
FIG. 6 is an in-use view of an embodiment of the disclosure.

With reference now to the drawings, and in particular to FIGS. 1 through 6 thereof, a new barrier device embodying the principles and concepts of an embodiment of the disclosure and generally designated by the reference numeral 10 will be described.

As best illustrated in FIGS. 1 through 6, the countertop barrier device 10 generally comprises a tubular housing 12, which is configured to be mountable to a surface 14 proximate to a back edge 16 of a countertop 18 so that the tubular housing 12 is removably mounted to the surface 14 and substantially parallel to the back edge 16. A grasp 20 is engaged to the tubular housing 12 and is configured to be grasped in a respective hand of a user to allow the user to position the tubular housing 12. As will become apparent, the tubular housing 12 can be mounted to the surface 14 in different orientations. For example, it may be convenient for the user to mount the tubular housing 12 so that it is perpendicular to the back edge 16 of the countertop 18.

A fastening element 22 is engaged to the tubular housing 12 and is configured to selectively engage the surface 14 so that the tubular housing 12 is removably mounted to the surface 14. The fastening element 22 may comprise a set of suction cups 24, each of which is resiliently compressible. The suction cups 24 are configured to be compressed between the tubular housing 12 and the surface 14 so that the tubular housing 12 is suctionally engaged to the surface 14. The suction cups 24 comprise one or more of silicone, rubber, and elastomer. The set of suction cups 24 may comprise two suction cups 24 positioned singly proximate to opposed ends 26 of the tubular housing 12. The set of suction cups 24 also may comprise one suction cup 24 positioned equally distant from the opposed ends 26 of the tubular housing 12, or more than two suction cups 24 positioned linearly along the tubular housing 12 between the opposed ends 26. The present invention anticipates the fastening element 22 comprising other fastening means, such as, but not limited to, magnets, pressure sensitive adhesives, and the like.

A slot 28 is positioned in the tubular housing 12 and extends from proximate to the opposed ends 26 of the tubular housing 12. A mat 30 is selectively extensible from and retractable into the tubular housing 12 through the slot 28. The mat 30 comprises one or more of silicone, rubber, and elastomer so that the mat 30 is sterilizable.

A spindle 32 is positioned in and is rotationally engaged to the tubular housing 12. The mat 30 is loopedly positioned around the spindle 32. A spring 34 is engaged to and extends between the tubular housing 12 and the spindle 32. The spring 34 is tensioned as the mat 30 is extended from the tubular housing 12 through the slot 28. The spring 34 is positioned to rebound to retract the mat 30 into the tubular housing 12 through the slot 28. The present invention also anticipates a pawl and ratchet assembly (not shown) operationally engaged to the spindle 32 to selectively retain the mat 30 in an extended configuration.

A fastener 36 is engaged to the mat 30 proximate to a leading edge 38 of the mat 30. The fastener 36 is configured to engage the countertop 18 proximate to a front edge 40 of the countertop 18 so that the mat 30 covers a portion 42 of the countertop 18. The mat 30 thus is configured for positioning of an article such that the article does not contact the countertop 18. The present invention is anticipated to be useful when a user is required to use a public restroom having poor or unknown sanitary conditions.

The fastener 36 may comprise a set of suctioning cups 44, each of which is resiliently compressible. The suctioning cups 44 are configured to be compressed between the mat 30 and the countertop 18 so that the mat 30 is suctionally engaged to the countertop 18. The suctioning cups 44 comprise one or more of silicone, rubber, and elastomer. The set of suctioning cups 44 may comprise two suctioning cups 44 positioned singly proximate to opposed sides 46 of the mat 30. The set of suctioning cups 44 also may comprise one suctioning cup 44 positioned equally distant from the opposed sides 46 of the mat 30, or more than two suctioning cups 44 positioned linearly proximate to the leading edge 38 of the mat 30. The present invention anticipates the fastener 36 comprising other fastening means, such as, but not limited to, magnets, hooks, and the like.

A rod 48 is engaged to the leading edge 38 of the mat 30, with the fastener 36 being engaged to the rod 48. The rod 48 is positioned to prevent retraction of the leading edge 38 through the slot 28. A handle 50 is engaged to the rod 48. The handle 50 is configured to be grasped in a respective hand of a user, positioning the user to pull on the handle 50 to extend the mat 30 from the tubular housing 12.

In use, the countertop barrier device 10 is deployed as needed in a restroom having suspect sanitary conditions or obviously deficient sanitary conditions. The user pushes down on the tubular housing 12 so that the suction cups 24 affix the tubular housing 12 to the countertop 18. The user then pulls on the handle 50 to extend the mat 30 over a portion 42 of the countertop 18. The user pushes down on the rod 48 so that the suctioning cups 44 attach the mat 30 to the countertop 18. The mat 30 provides a sanitary barrier between an article or articles, such as a toothbrush, tube of toothpaste, razor, and the like, and the countertop 18. When the mat 30 is no longer required, it is retracted into the tubular housing 12 by rebounding of the spring 34. The user then can sanitize the mat 30 at their convenience and have it ready for future use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A countertop barrier device comprising:
   a tubular housing configured to be mountable to a surface proximate to a back edge of a countertop, such that the tubular housing is removably mounted to the surface and substantially parallel to the back edge;
   a slot positioned in the tubular housing and extending from proximate to opposed ends of the tubular housing;
   a mat selectively extensible from and retractable into the tubular housing through the slot;
   a fastener engaged to the mat proximate to a leading edge of the mat, the fastener being configured for engaging the countertop proximate to a front edge of the countertop, such that the mat covers a portion of the countertop, wherein the mat is configured for positioning of an article, such that the article does not contact the countertop;
   a grasp engaged to the tubular housing, wherein the grasp is configured for grasping in a respective hand of a user for positioning the tubular housing;
   a rod engaged to the leading edge of the mat, such that the rod is positioned for preventing retraction of the leading edge through the slot, the fastener being engaged to the rod; and
   a handle engaged to the rod, wherein the handle is configured for grasping in a respective hand of a user, positioning the user for pulling on the handle for extending the mat from the tubular housing.

2. The countertop barrier device of claim 1, further including, a fastening element engaged to the tubular housing and being configured for selectively engaging the surface, such that the tubular housing is removably mounted to the surface.

3. The countertop barrier device of claim 2, wherein the fastening element comprises a set of suction cups, the suction cups being resiliently compressible, wherein the suction cups are configured for compressing between the tubular housing and the surface, such that the tubular housing is suctionally engaged to the surface.

4. The countertop barrier device of claim 3, wherein the suction cups comprise one or more of silicone, rubber, and elastomer.

5. The countertop barrier device of claim 3, wherein the set of suction cups comprises two suction cups positioned singly proximate to the opposed ends of the tubular housing.

6. The countertop barrier device of claim 1, wherein the mat comprises one or more of silicone, rubber, and elastomer, such that the mat is sterilizable.

7. The countertop barrier device of claim 1, further including:
a spindle positioned in and rotationally engaged to the tubular housing, the mat being loopedly positioned around the spindle; and
a spring engaged to and extending between the tubular housing and the spindle, such that the spring is tensioned as the mat is extended from the tubular housing through the slot, such that the spring is positioned for rebounding for retracting the mat into the tubular housing through the slot.

8. The countertop barrier device of claim 1, wherein the fastener comprises a set of suctioning cups, the suctioning cups being resiliently compressible, wherein the suctioning cups are configured for compressing between the mat and the countertop, such that the mat is suctionally engaged to the countertop.

9. The countertop barrier device of claim 8, wherein the suctioning cups comprise one or more of silicone, rubber, and elastomer.

10. The countertop barrier device of claim 8, wherein the set of suctioning cups comprises two suctioning cups positioned singly proximate to opposed sides of the mat.

11. A countertop barrier device comprising:
a tubular housing configured to be mountable to a surface proximate to a back edge of a countertop, such that the tubular housing is removably mounted to the surface and substantially parallel to the back edge;
a fastening element engaged to the tubular housing and being configured for selectively engaging the surface, such that the tubular housing is removably mounted to the surface, the fastening element comprising a set of suction cups, the suction cups being resiliently compressible, wherein the suction cups are configured for compressing between the tubular housing and the surface, such that the tubular housing is suctionally engaged to the surface, the suction cups comprising one or more of silicone, rubber, and elastomer, the set of suction cups comprising two suction cups positioned singly proximate to opposed ends of the tubular housing;
a grasp engaged to the tubular housing, wherein the grasp is configured for grasping in a respective hand of a user for positioning the tubular housing;
a slot positioned in the tubular housing and extending from proximate to the opposed ends of the tubular housing;
a mat selectively extensible from and retractable into the tubular housing through the slot, the mat comprising one or more of silicone, rubber, and elastomer, such that the mat is sterilizable;
a spindle positioned in and rotationally engaged to the tubular housing, the mat being loopedly positioned around the spindle;
a spring engaged to and extending between the tubular housing and the spindle, such that the spring is tensioned as the mat is extended from the tubular housing through the slot, such that the spring is positioned for rebounding for retracting the mat into the tubular housing through the slot;
a fastener engaged to the mat proximate to a leading edge of the mat, the fastener being configured for engaging the countertop proximate to a front edge of the countertop, such that the mat covers a portion of the countertop, wherein the mat is configured for positioning of an article, such that the article does not contact the countertop, the fastener comprising a set of suctioning cups, the suctioning cups being resiliently compressible, wherein the suctioning cups are configured for compressing between the mat and the countertop, such that the mat is suctionally engaged to the countertop, the suctioning cups comprising one or more of silicone, rubber, and elastomer, the set of suctioning cups comprising two suctioning cups positioned singly proximate to opposed sides of the mat;
a rod engaged to the leading edge of the mat, such that the rod is positioned for preventing retraction of the leading edge through the slot, the fastener being engaged to the rod; and
a handle engaged to the rod, wherein the handle is configured for grasping in a respective hand of a user, positioning the user for pulling on the handle for extending the mat from the tubular housing.

* * * * *